(12) United States Patent
Rectenwald et al.

(10) Patent No.: US 10,752,803 B2
(45) Date of Patent: Aug. 25, 2020

(54) 1K HIGH HARDNESS, HIGH IMPACT RESISTANCE COATING

(71) Applicant: THE SHERWIN-WILLIAMS COMPANY, Cleveland, OH (US)

(72) Inventors: Michael F Rectenwald, Cleveland, OH (US); Brian Makowski, Reminderville, OH (US)

(73) Assignee: The Sherwin-Williams Company, Cleveland, OH (US)

(*) Notice: Subject to any disclaimer, the term of this patent is extended or adjusted under 35 U.S.C. 154(b) by 150 days.

(21) Appl. No.: 16/135,252

(22) Filed: Sep. 19, 2018

(65) Prior Publication Data

US 2019/0085202 A1 Mar. 21, 2019

Related U.S. Application Data

(60) Provisional application No. 62/560,234, filed on Sep. 19, 2017.

(51) Int. Cl.

| | |
|---|---|
| *C08G 18/12* | (2006.01) |
| *C08G 18/16* | (2006.01) |
| *C08G 18/18* | (2006.01) |
| *C08G 18/24* | (2006.01) |
| *C08G 18/28* | (2006.01) |
| *C08G 18/38* | (2006.01) |
| *C08G 18/75* | (2006.01) |
| *C08G 18/78* | (2006.01) |
| *C08G 18/79* | (2006.01) |
| *C08K 3/22* | (2006.01) |
| *C09D 5/00* | (2006.01) |
| *C09D 7/61* | (2018.01) |
| *C09D 7/63* | (2018.01) |
| *C09D 175/02* | (2006.01) |
| *C09D 175/04* | (2006.01) |

(52) U.S. Cl.
CPC ......... *C09D 175/02* (2013.01); *C08G 18/12* (2013.01); *C08G 18/163* (2013.01); *C08G 18/18* (2013.01); *C08G 18/1883* (2013.01); *C08G 18/242* (2013.01); *C08G 18/283* (2013.01); *C08G 18/284* (2013.01); *C08G 18/289* (2013.01); *C08G 18/3893* (2013.01); *C08G 18/758* (2013.01); *C08G 18/7887* (2013.01); *C08G 18/791* (2013.01); *C08G 18/792* (2013.01); *C09D 5/00* (2013.01); *C09D 7/61* (2018.01); *C09D 7/63* (2018.01); *C09D 175/04* (2013.01); *C08K 3/22* (2013.01); *C08K 2003/2241* (2013.01)

(58) Field of Classification Search
CPC .... C08G 18/12; C08G 18/18; C08G 18/1883; C08G 18/163; C08G 18/242; C08G 18/289; C08G 18/284; C08G 18/758; C08G 18/791; C08G 18/3893; C08G 18/792; C08G 18/7887; C08K 3/22; C08K 2003/2241; C09D 5/00; C09D 7/61; C09D 7/63; C09D 175/02; C09D 175/04

See application file for complete search history.

(56) References Cited

U.S. PATENT DOCUMENTS

| | | | |
|---|---|---|---|
| 6,790,903 B1* | 9/2004 | Majolo | C09J 201/10 524/506 |
| 2010/0216951 A1* | 8/2010 | Webster | C08F 283/006 525/452 |
| 2012/0071584 A1* | 3/2012 | Lutz | C08G 18/10 523/428 |

* cited by examiner

*Primary Examiner* — Patrick D Niland

(57) ABSTRACT

A coating composition can be made by providing an aminoalkoxysilane and, in the substantial absence of water, reacting at least a portion of the aminoalkoxysilane with at least one epoxide-containing compound including an aliphatic group to yield at least one alkoxysilylamine, and then reacting the alkoxysilylamine with at least one isocyanate reagent containing at least two isocyanate groups to yield a monomer having plural alkoxysilane groups and, in many embodiments, at least two branched aliphatic groups having at least six carbon atoms. A coating composition thus formed exhibits high durability and good flexibility. Also disclosed is a method of applying a coating composition to a substrate and allowing the coating composition to cure, and the cured coating resulting from such application.

47 Claims, No Drawings

1K HIGH HARDNESS, HIGH IMPACT RESISTANCE COATING

This application claims the benefit of U.S. provisional application No. 62/560,234 filed on Sep. 19, 2017, the entirety of which is hereby incorporated by reference.

TECHNICAL FIELD

The disclosure relates generally to a coating composition having high hardness and high impact resistance. The disclosed coating composition is suitable for a variety of uses including application to interior or exterior surfaces such as wood, drywall, cement, metal, and plaster, or over a primer coating, and application to metals, composites, and other materials as a protective coating.

BACKGROUND

Coating compositions are often used in applications to cover interior or exterior surfaces of buildings. Typically, a user applies a coating composition that cures with exposure to the ambient environment to form a coating. Coatings desirably have a high hardness to inhibit damage. Some materials used to impart hardness can cause deterioration of flexibility, which may lead to premature cracking and failure of the coating. Known coatings compositions may be solvent-based or may be aqueous. It is desirable to avoid organic solvents, which impart a high level of volatile organic compounds ("VOCs"), such as ethylene glycol, formaldehyde, or benzene.

It would be desirable to produce a coating composition that is a single-component (or "1K") composition not requiring pre-mixing by the consumer, and that cures to form a cured coating that has both high hardness and high impact resistance. It would be particularly desirable to produce a coating composition having a low VOC concentration (less than 100 grams/liter). It would also be desirable for the coating composition to be suitable for application to interior or exterior surfaces such as wood, drywall, cement, metal, and plaster, or over a primer coating, and suitable for application to metals, composites, and other materials as a protective coating. The coating composition should cure at ambient temperature and without ancillary equipment such as ultraviolet lights.

SUMMARY

In various nonexclusive embodiments, the present application provides a coating composition, a method of making a coating composition, a method of applying a coating composition, and a cured coating.

A coating composition may be made by providing an aminoalkoxysilane and, in the substantial absence of water, reacting at least a portion of the aminoalkoxysilane with at least one epoxide-containing compound including an aliphatic group to yield at least one alkoxysilylamine; and reacting the alkoxysilylamine with at least one isocyanate reagent containing at least two isocyanate groups to yield a monomer, the monomer being a urea prepolymer with moisture reactive siloxane functional groups. These plural alkoxysilane groups enable crosslinking of the composition when exposed to ambient water. The composition preferably includes a catalytic deprotectant, such as an alkylamine or an organotin, in an amount effective to deprotect alkoxy groups in the monomer to facilitate such crosslinking. Although the reactants may be combined in any suitable ratio relative to one another, it has been found that, when 0.5 to 1.5 parts of the aminoalkoxysilane are blended with 0.25 to 1.5 parts of the epoxy compound to form the alkoxysilylamine, and when the alkoxysilylamine product is blended with 0.05 to 0.75 parts of the isocyanate reagent, the resulting coating composition has both satisfactory hardness and desirable flexibility. Upon application of the coating composition and exposure of the monomer to ambient water, the siloxane groups on the monomer become capable of cross-linking and the coating cures. The coating composition may be formulated to have a viscosity that allows easy handling, storage, and application of the composition, and to yield a cured coating that can have both high hardness and high impact resistance.

In an embodiment, at least a portion of an aminoalkoxysilane is reacted in the substantial absence of water with an epoxy compound having a branched aliphatic group to form an alkoxysilylamine, this alkoxysilylamine then being reacted with an isocyanate reagent containing at least two isocyanate groups to yield a monomer having plural alkoxysilane groups. For example, 0.5 to 1.5 parts of the aminoalkoxysilane can be blended and reacted with 0.25 to 15 parts of the epoxy compound, and the product of this reaction can be blended and reacted with 0.05 to 0.75 parts of the isocyanate reagent.

In another embodiment, a portion of an aminoalkoxysilane is reacted in the substantial absence of water with a first epoxy compound having a branched aliphatic group and a second epoxy compound having a linear aliphatic group to form a mixture of alkoxysilylamines, this mixture then being reacted with an isocyanate reagent containing at least two isocyanate groups to yield a monomer having plural alkoxysilane groups, these alkoxysilane groups again being capable of curing upon deprotection to form a cured coating. The components may be reacted with one another in any suitable amounts, but it has been found that when 0.5 to 1.5 parts of the aminoalkoxysilane are blended and reacted with 0.25 to 1.5 parts of the first epoxy compound and 0.25 to 1.5 parts of the second epoxy compound, and when the resulting product is blended with 0.05 to 0.75 parts of the isocyanate reagent, the cured coating can exhibit both high hardness and high impact resistance.

DETAILED DESCRIPTION

The coating compositions described herein can be formulated to have certain properties that are desirable in a coating composition. For example, it is desirable that the coating composition should be a 1K coating composition and that the coating composition has a low VOC content. The coating compositions described herein can be formulated as 1K compositions and can be formulated to have a low VOC content. In exemplary coating compositions, the VOC content is less than 150 grams/liter, less than 125 grams/liter, less than 100 grams/liter, less than 75 grams/liter, less than 50 grams/liter, less than 25 grams/liter, or essentially zero VOC content (less than 5 grams/liter). The composition can be a 100% solids composition, which is contemplated that the composition is free or essentially free of solvents. It is contemplated that solvents may be used if desired in a coating composition as provided herein.

Additional desirable properties include hardness and impact resistance, which are properties that can be mutually difficult to achieve in a coating composition. Exemplary coating compositions prepared in accordance with the present disclosure can yield a cured coating having a pencil hardness of at least H, at least 2H, at least 3H, at least 4H, at least 5H, or at least 6H, as determined by ASTM D5363 (2016). Such coating compositions also can yield a cured coating having an impact hardness of at least 140, at least 150, at least 160, at least 170, and at least 180, as determined by ASTM D2794 (2016). The coating compositions additionally can be formulated to have a viscosity of 2 to 5 Stokes, for example, 2.5 to 4.5 Stokes, 3 to 4 Stokes, or 3.2 to 3.8 Stokes, at 25° C., the viscosity being determined using a conventional bubble viscometer.

The reaction paths summarized above begin with an aminoalkoxysilane, by which is contemplated any suitable compound having alkoxysilyl and amino groups. The aminoalkoxysilane may have a structure represented by the following formula (1):

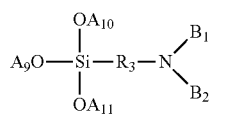
(1)

where $A_9$, $A_{10}$, and $A_{11}$ are the same or different and comprise hydrogen or $C_1$-$C_4$ alkyl, with the proviso that at least one of $A_9$, $A_{10}$, and $A_{11}$ comprises $C_1$-$C_4$ alkyl, where $B_1$ and $B_2$ are the same or different and comprise hydrogen or $C_1$-$C_4$ alkyl, with the proviso that at least one of $B_1$ and $B_2$ is hydrogen, and where $R_3$ is $C_1$-$C_4$ alkyl. In some embodiments, $A_1$, $A_2$, and $A_3$ each comprises $C_1$-$C_4$ alkyl. For example, the aminoalkoxysilane may comprise an aminopropyl trialkoxysilane, such as aminopropyl trimethoxysilane sold under the trademark DYNASYLAN® AMMO by Evonik Industries:

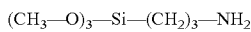

In some embodiments, a single type of aminoalkoxysilane is used, and in other embodiments two or more aminoalkoxysilane forming a mixture of aminoalkoxysilanes may be employed.

In a first approach at least a portion of the aminoalkoxysilane is reacted with an epoxy compound (epoxide-containing compound) of the following formula (2):

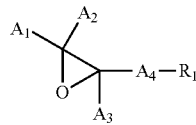
(2)

wherein $A_1$-$A_3$ are the same or different and comprise hydrogen or a carbon-containing group with one to three carbon atoms, $A_4$ comprises a carbonyl-containing linking group, and $R_1$ comprises a branched aliphatic group having at least six carbon atoms. In some embodiments, the epoxide-containing compound of formula (2) is a glycidyl aliphatic ester. The glycidyl aliphatic ester may, for example, have the following formula (3):

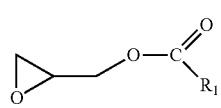
(3)

wherein $R_1$ comprises a branched aliphatic group having at least six carbon atoms. An example of a suitable glycidyl aliphatic ester has the following formula (4):

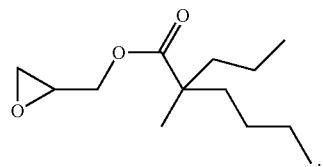
(4)

The glycidyl aliphatic ester of formula (4) is available as CARDURA™ E10-P from Hexion, Inc. Without intending to be bound by any particular theory, it is generally believed that just impact the impact resistance of a cured coating formed from the coating composition can be increased by including in the coating composition the residue of the glycidyl aliphatic ester of formula (4).

In some aspects of the first approach, another portion of the aminoalkoxysilane is reacted with an epoxy compound of the following formula (5):

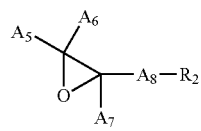
(5)

wherein $A_5$-$A_7$ are the same or different and comprise hydrogen or a carbon-containing group with one to three carbon atoms, $A_8$ comprises an ether-containing linking group, and $R_2$ comprises a linear aliphatic group having at least two carbon atoms. In some embodiments, the compound of formula (5) is a glycidyl aliphatic ether. The glycidyl aliphatic ether may, for example, have the following formula (6):

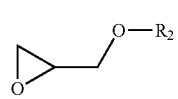
(6)

wherein $R_2$ comprises a linear aliphatic group having at least two carbon atoms. An example a glycidyl aliphatic ether has the following formula (7):

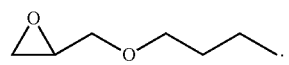
(7)

The glycidyl aliphatic ether of formula (7) is available as ERISYS® GE-5 from CVC Thermoset Specialties. Without intending to be bound by any particular theory, it is generally believed that the viscosity of a coating composition can be decreased by including therein a residue of the glycidyl aliphatic ether of formula (7).

Generally, upon reaction of an aminoalkoxysilane with an epoxy compound, the resulting product or product blend is reacted with an isocyanate reagent. Any suitable isocyanate reagent may be employed. In some embodiments, an isocyanate reagent including a single type of isocyanate compound is used. In other embodiments, an isocyanate reagent includes a mixture of isocyanate compounds. Without intending to be bound by any particular theory, it is generally believed that it is possible to increase the hardness of a cured coating by forming the coating from a coating composition comprising a residue of an isocyanate reagent. In theory, it is also believed that the viscosity of a coating composition will increase by including therein a residue of an isocyanate reagent.

In some embodiments, an isocyanate reagent useful for making a coating composition includes a compound having the following formula (8):

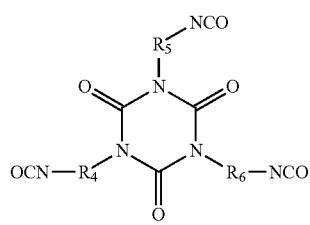
(8)

wherein $R_4$-$R_6$ are the same or different and comprise two to eight carbon atoms.

A specific example such isocyanate reagent comprises a compound of formula (9), available as DESMODUR® N-3300, available from Covestro and having the following formula:

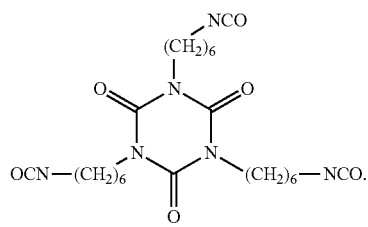
(9)

In some embodiments, an isocyanate reagent useful for making a coating composition includes a compound having the following formula (10):

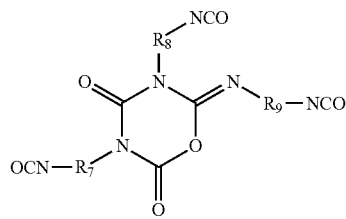
(10)

wherein $R_7$-$R_9$ are the same or different and comprise two to eight carbon atoms. A specific example of such isocyanate reagent comprises a compound of formula (11), available as DESMODUR® 3900:

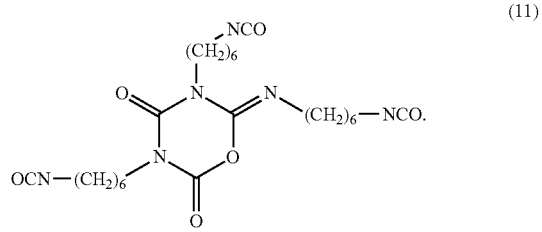
(11)

Without intending to be bound by any particular theory, it is generally believed that the asymmetrical ring structure of the compound of formula (11) causes a decrease in viscosity of the resulting coating composition.

In some embodiments, a coating composition is made using an isocyanate reagent including at least one of (8) and (10), or combinations of (8) and (10).

The resulting reaction will form a monomer that is suitable for use as a coating composition. In some embodiments, a coating composition comprises a monomer having plural alkoxysilane groups, the monomer including at least one of (12) and (13):

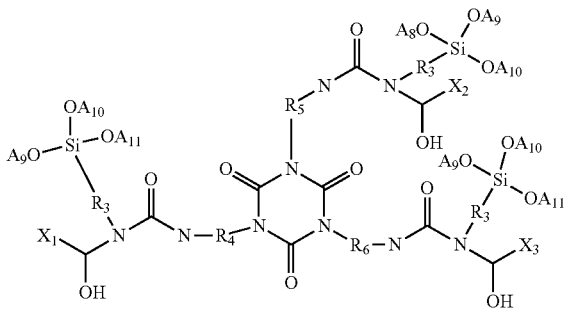
(12)

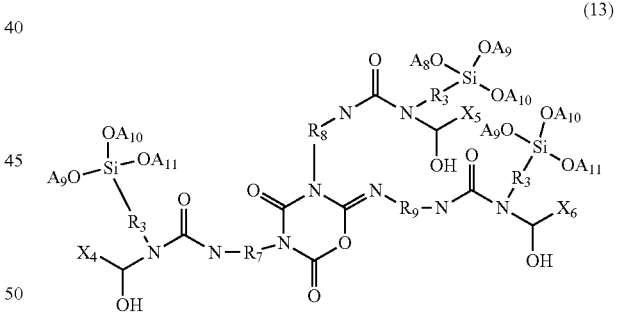
(13)

wherein $A_9$, $A_{10}$, and Au are the same or different and comprise hydrogen or $C_1$-$C_4$ alkyl, with the proviso that at least one of $A_9$, $A_{10}$, and $A_{11}$ comprises $C_1$-$C_4$ alkyl, $R_3$ is $C_1$-$C_4$ alkyl, $R_4$-$R_6$ are the same or different and comprise two to eight carbon atoms, $R_7$-$R_9$ are the same or different and comprise two to eight carbon atoms, $X_1$-$X_3$ are the same or different and comprise one the following groups (a) and (b), and $X_4$-$X_6$ are the same or different and comprise one of groups (a) and (b):

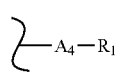
(a)

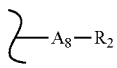

(b)

wherein $A_4$ includes a carbonyl-containing linking group, $R_1$ comprises a branched aliphatic group having at least six carbon atoms, $A_8$ includes an ether-containing linking group, and $R_2$ comprises a linear aliphatic group having at least two carbon atoms. Exemplary such monomers include (14) and (15):

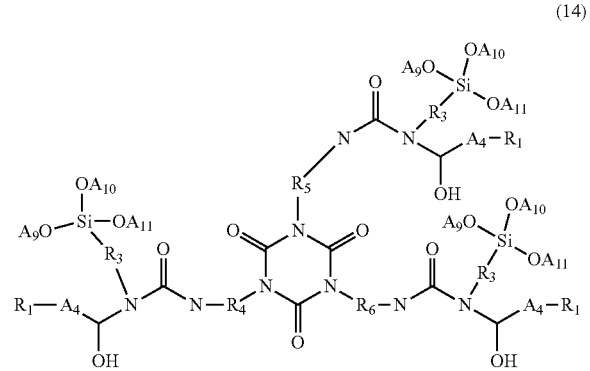

(14)

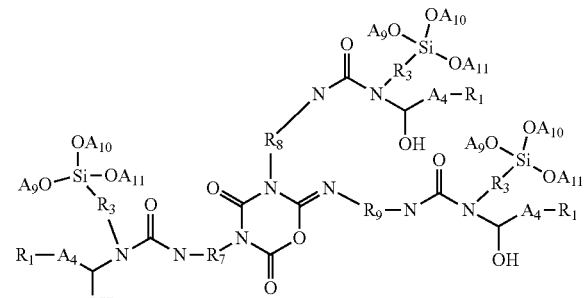

(15)

wherein $A_4$ includes a carbonyl-containing linking group, $A_9$, $A_{10}$, and $A_{11}$ are the same or different and comprise hydrogen or $C_1$-$C_4$ alkyl, with the proviso that at least one of $A_9$, $A_{10}$, and $A_{11}$ comprises $C_1$-$C_4$ alkyl, $R_1$ comprises a branched aliphatic group having at least six carbon atoms, $R_3$ is $C_1$-$C_4$ alkyl, $R_4$-$R_6$ are the same or different and comprise two to eight carbon atoms, and $R_7$-$R_9$ are the same or different and comprise two to eight carbon atoms. Specific examples include (16) and (17):

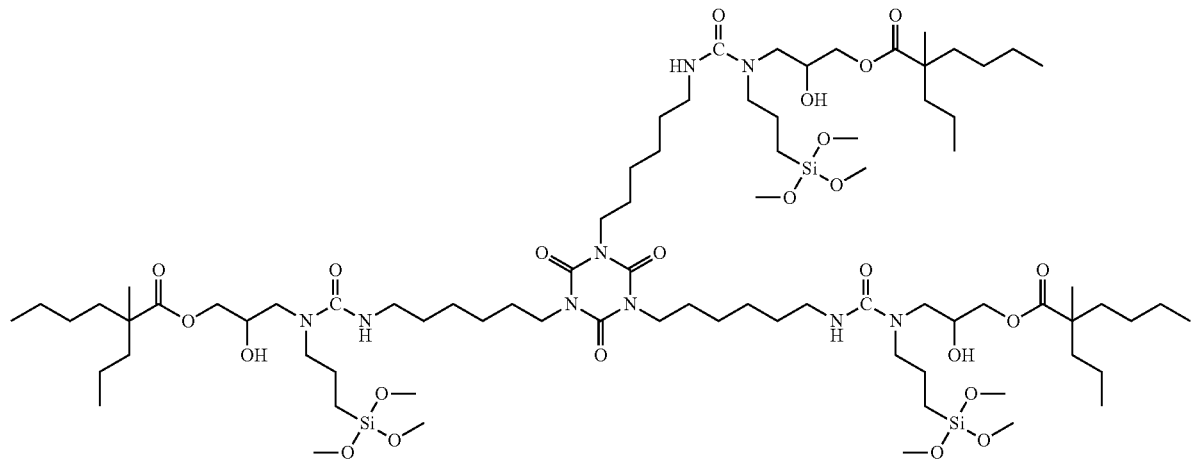

(16)

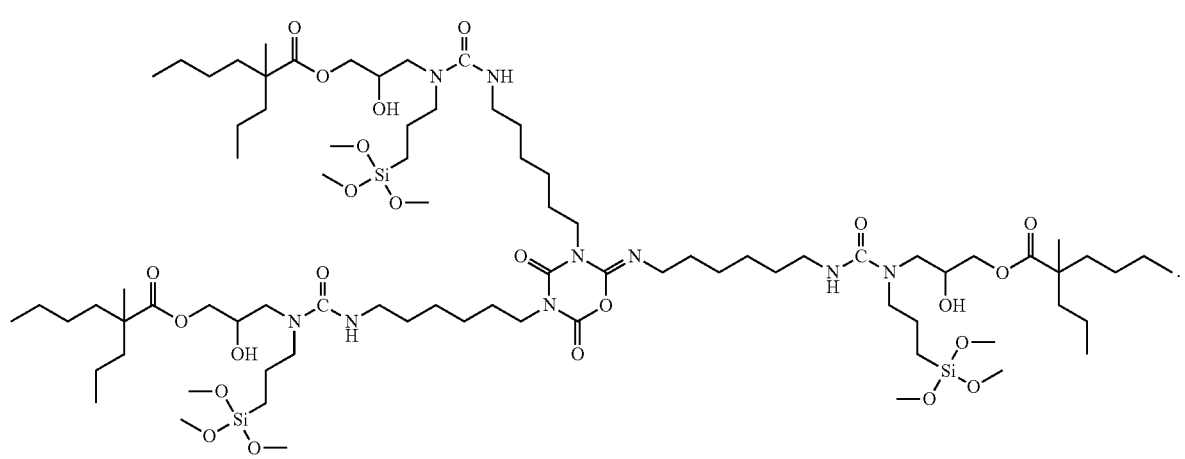

(17)

It is contemplated that the isocyanate in many embodiments should be used in less than a stoichiometric amount than needed for complete reaction with the intermediate product formed by reaction of the aminoalkoxysilane with the epoxy compound. The viscosity of the resulting urea prepolymer will otherwise be too high in many cases. In exemplary methods including a reaction between aminoalkoxysilane and a compound of formula (2), 0.5 to 1.5 parts, 0.75 to 1.25 parts, or 0.85 to 1.15 parts of an aminoalkoxysilane is blended for reaction with 0.25 to 1.5 parts, 0.3 to 1.0 parts, or 0.4 to 0.75 parts of a compound of formula (2). The alkoxysilylamine can be reacted with 0.05 to 0.75, 0.2 to 0.6 parts, or 0.3 to 0.5 parts of an isocyanate reagent.

In exemplary methods including reactions between an aminoalkoxysilane and compounds of formulas (2) and (5), 0.5 to 1.5 parts, 0.75 to 1.25 parts, or 0.85 to 1.15 parts of an aminoalkoxysilane is blended for reaction with 0.25 to 1.5 parts, 0.3 to 1.0 parts, or 0.4 to 0.75 parts of a compound of formula (2) and 0.25 to 1.5 parts, 0.3 to 1.0 parts, or 0.4 to 0.75 parts of a compound of formula (5). The mixture of alkoxysilylamines can then be reacted with 0.05 to 0.75, 0.2 to 0.6 parts, or 0.3 to 0.5 parts of an isocyanate reagent.

In an exemplary embodiment, a portion of an aminoalkoxysilane is reacted with a compound of formula (4) and another portion of the aminoalkoxysilane is reacted with a compound of formula (7) to yield a mixture alkoxysilylamines; and the mixture alkoxysilylamines is reacted with an isocyanate reagent comprising at least one of (9) and (11) to yield at least one of a group including formulas (16), (17), and the following formulas (18)-(19):

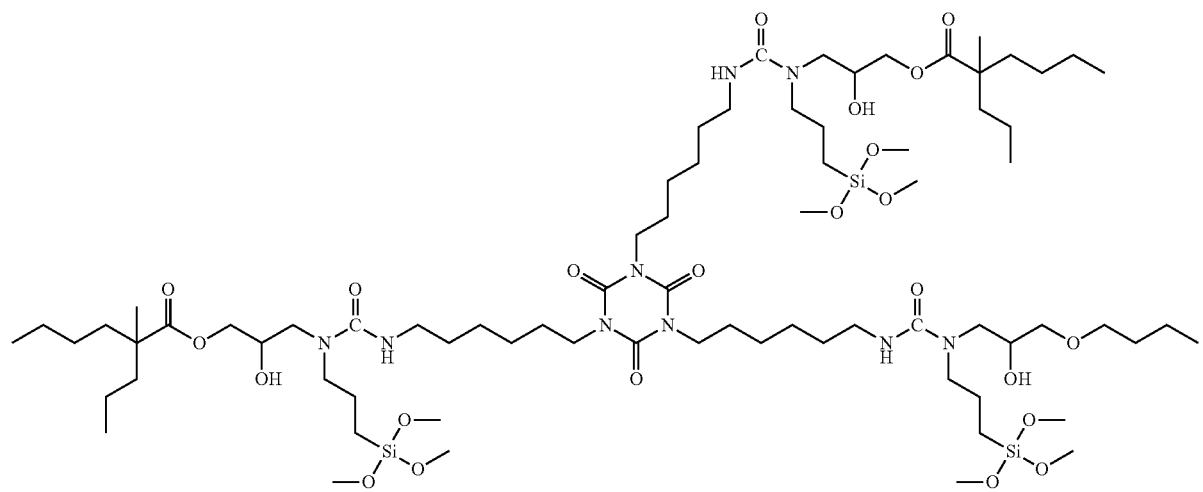

(18)

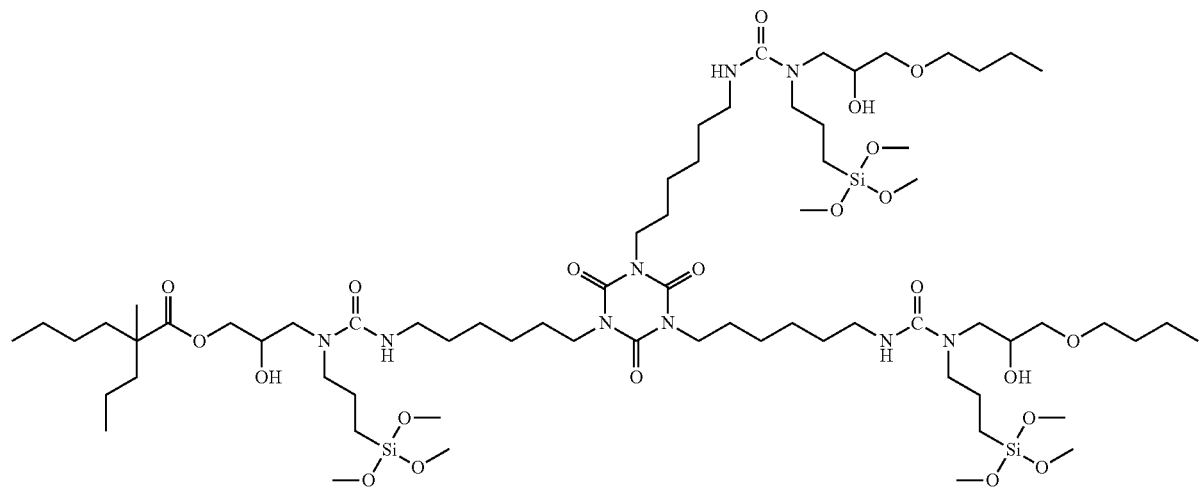

(19)

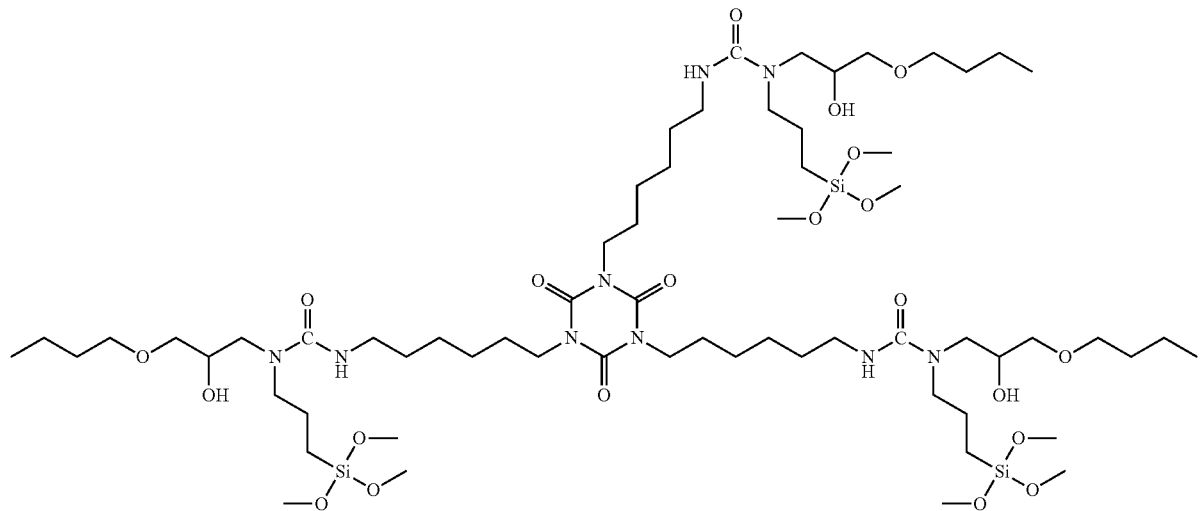
(20)
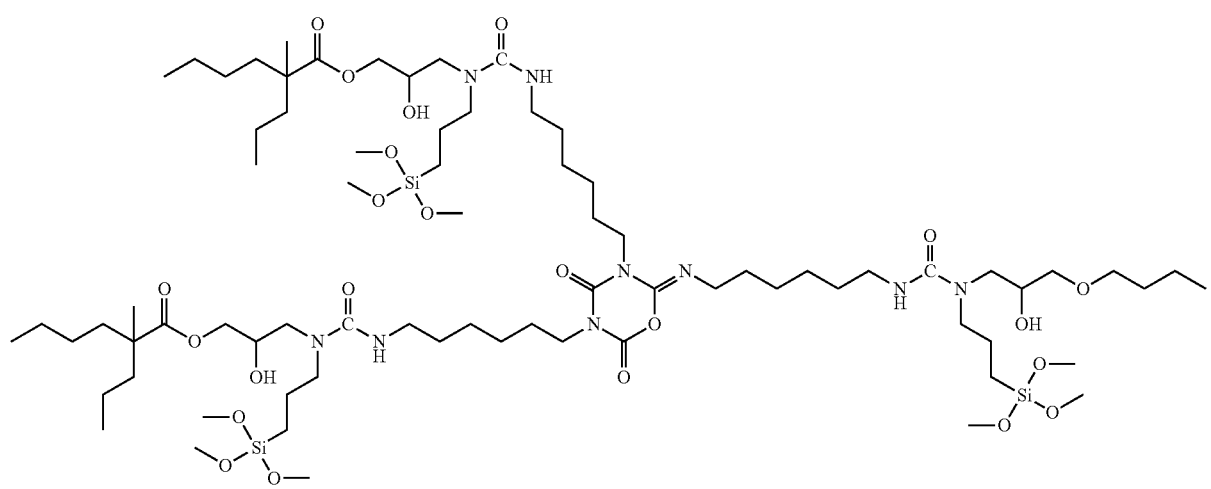
(21)
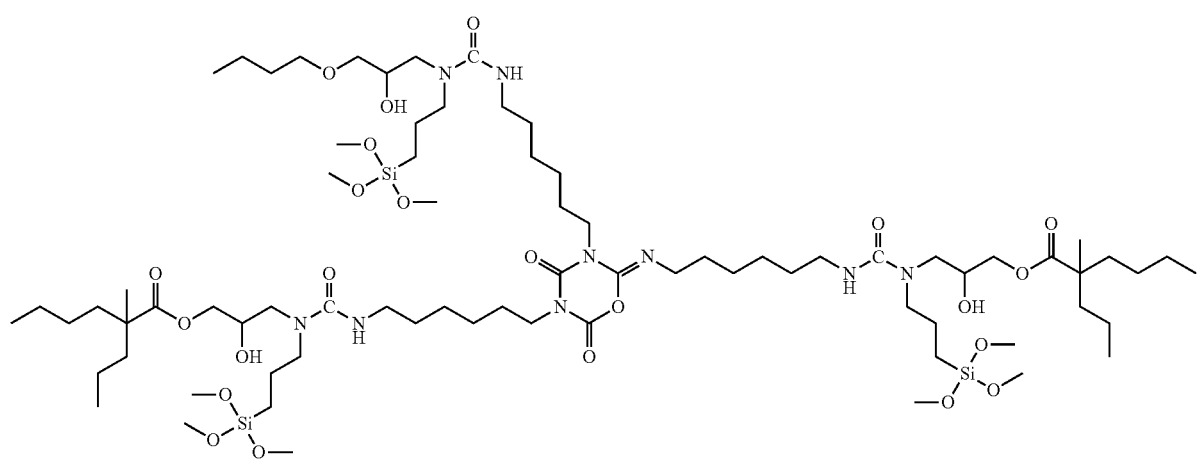
(22)

(23)
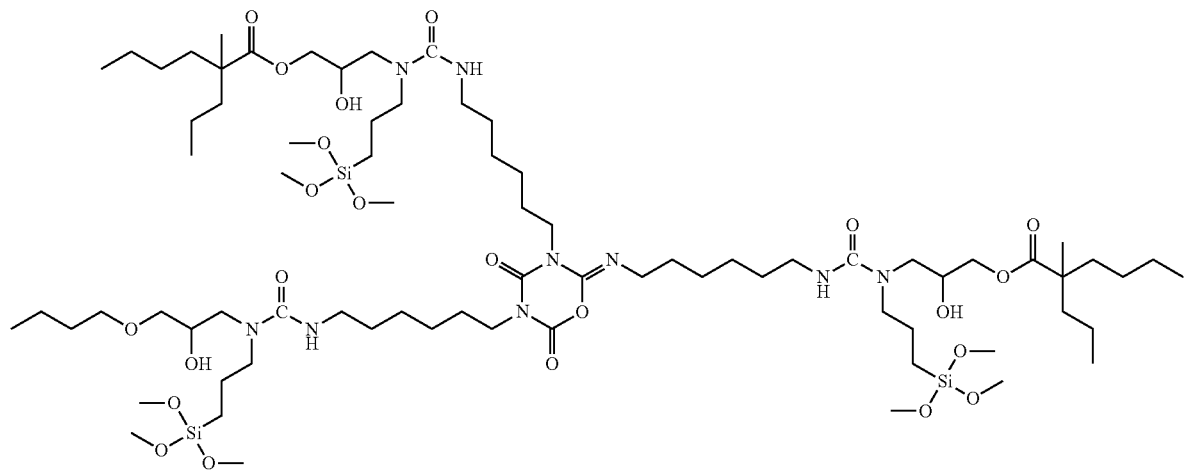
(24)
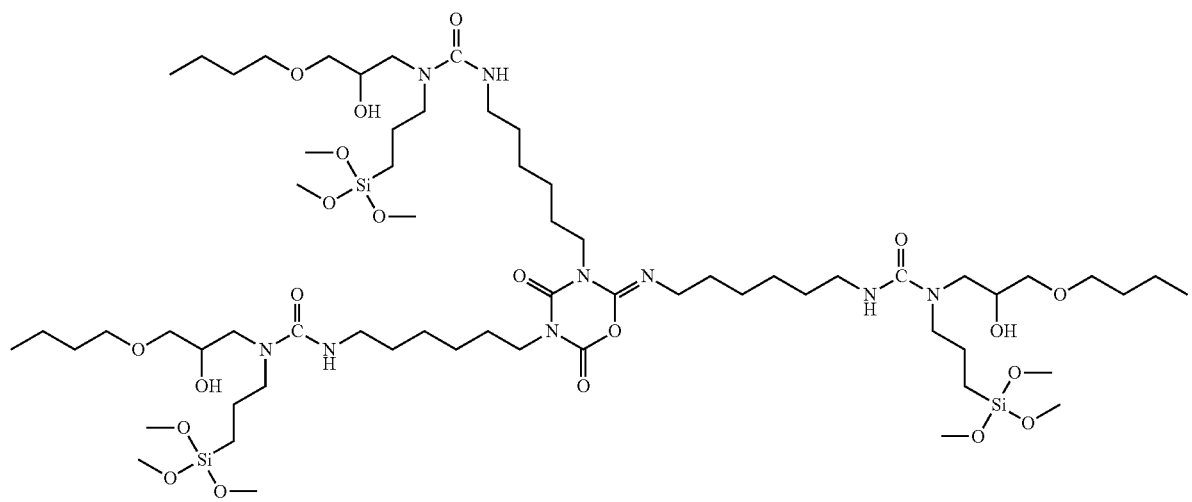
(25)
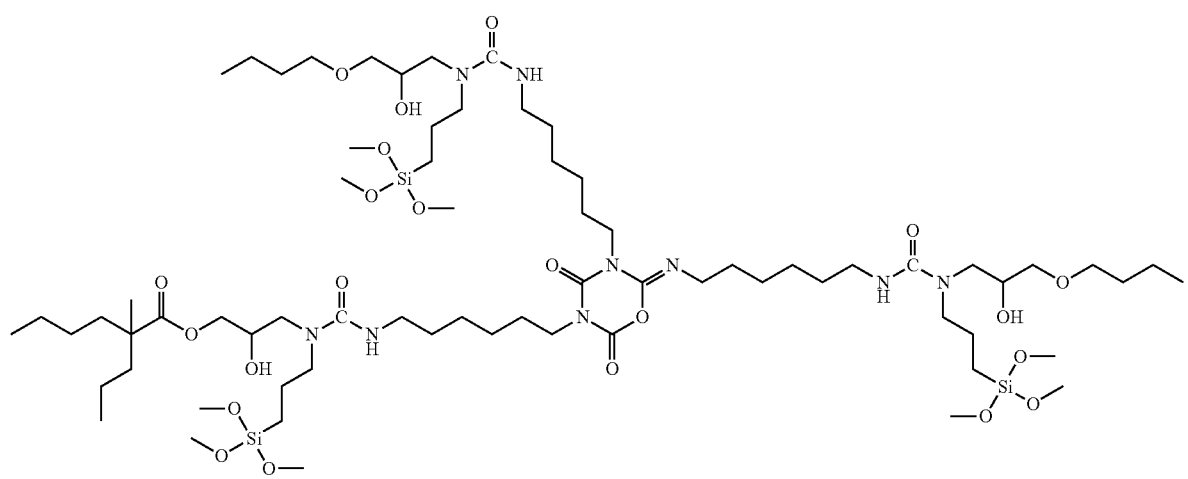

(26)

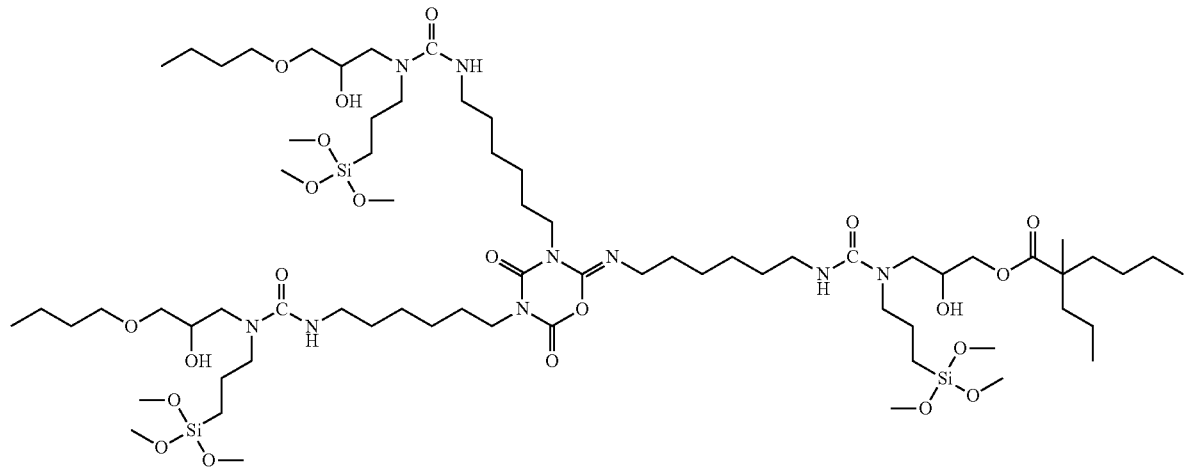

(27)

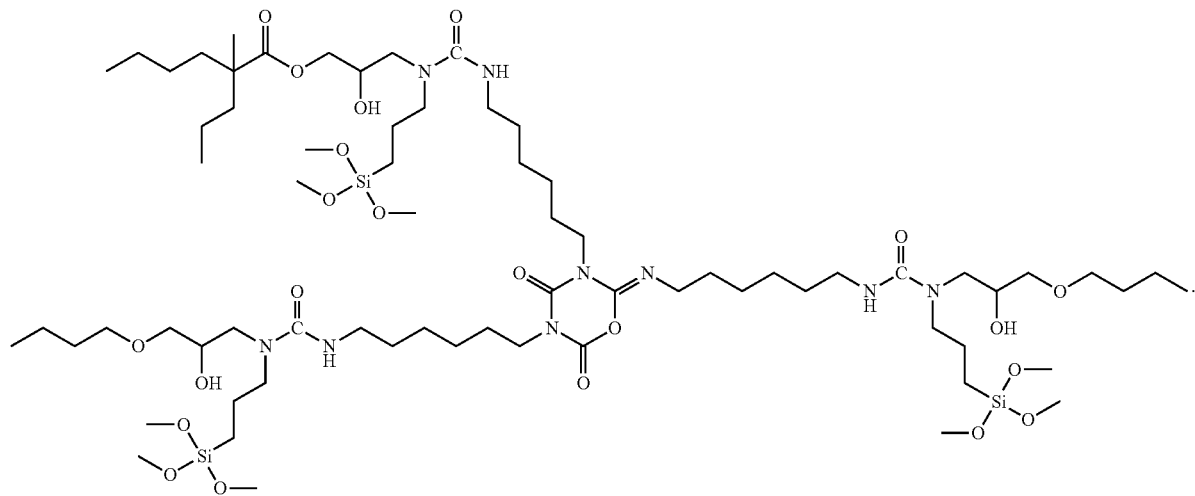

An embodiment of a coating composition comprises at least one of (16), (17), (18-27).

In a second reaction pathway, a portion of aminoalkoxysilane is reacted with a compound of formula (2) and another portion of the aminoalkoxysilane is reacted with a compound of formula (5) to yield a mixture of alkoxysilylamines.

In some embodiments, the aminoalkoxysilane is reacted with a blend of compounds of formula (4) and formula (7) to form an intermediate product mixture. The compounds of formulas (4) and (7) may be used in any amounts relative to one another. In some embodiments, equal amounts of (4) and (7) are employed.

Upon reaction of the aminoalkoxysilane with the epoxy compounds, the resulting mixture of alkoxysilylamines is blended with an isocyanate reagent. In some embodiments, an isocyanate reagent useful for making a coating composition includes a compound having the following formula (28):

OCN—R$_{10}$—NCO  (28)

wherein R$_{10}$ comprises a linear, branched, cyclic, or bicyclic aliphatic group having at least seven carbon atoms. An example of a suitable isocyanate reagent comprises a compound of formula (29):

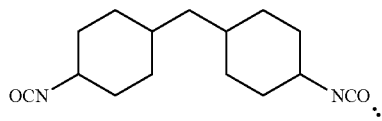

(29)

The isocyanate compound according to formula (29) is available as DESMODUR® W.

In an aspect, a portion of an aminoalkoxysilane is reacted with a compound of formula (2) and another portion of the aminoalkoxysilane is reacted with a compound of formula (5) to yield a mixture of alkoxysilylamines; and the mixture alkoxysilylamines is reacted with an isocyanate reagent comprising a compound of formula (28) to yield a monomer having plural alkoxysilane groups, the monomer comprising at least one compound according to formula (30):

(30)

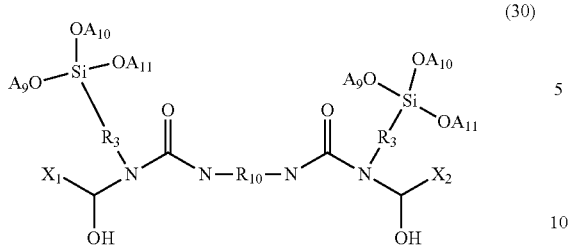

wherein $A_9$, $A_{10}$, and $A_{11}$ are the same or different and comprise hydrogen or $C_1$-$C_4$ alkyl, with the proviso that at least one of $A_9$, $A_{10}$, and $A_{11}$ comprises $C_1$-$C_4$ alkyl, $R_3$ is $C_1$-$C_4$ alkyl, $R_{10}$ comprises a linear, branched, cyclic, or bicyclic aliphatic group having at least seven carbon atoms, and $X_7$ and $X_8$ are the same or different and comprise one the following groups (a) and (b):

(a)

$\bigg\}\!\!-\!\!A_4\!-\!R_1$ (b)

$\bigg\}\!\!-\!\!A_8\!-\!R_2$ wherein $A_4$ includes a carbonyl-containing linking group, $R_1$ comprises a branched aliphatic group having at least six carbon atoms, $A_8$ includes an ether-containing linking group, and $R_2$ comprises a linear aliphatic group having at least two carbon atoms. An embodiment of a coating composition comprises at least one compound according to formula (30).

In an embodiment, a portion of an aminoalkoxysilane is reacted with a compound of formula (4) and another portion of the aminoalkoxysilane is reacted with a compound of formula (7) to yield a mixture alkoxysilylamines; and the mixture alkoxysilylamines is reacted with an isocyanate reagent comprising the compound of formula (29) to yield at least one selected from (31), (32), and (33):

(31)

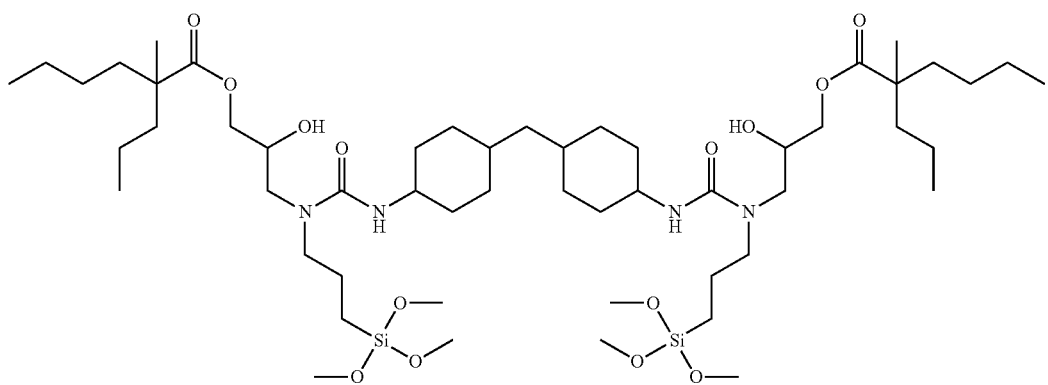

(32)

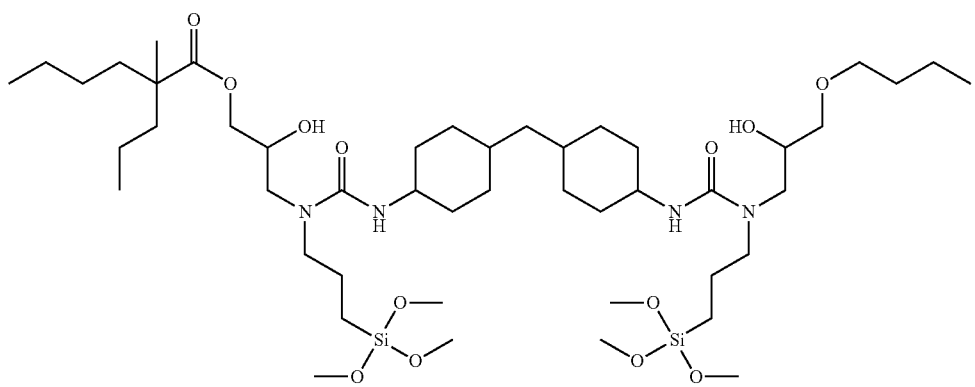

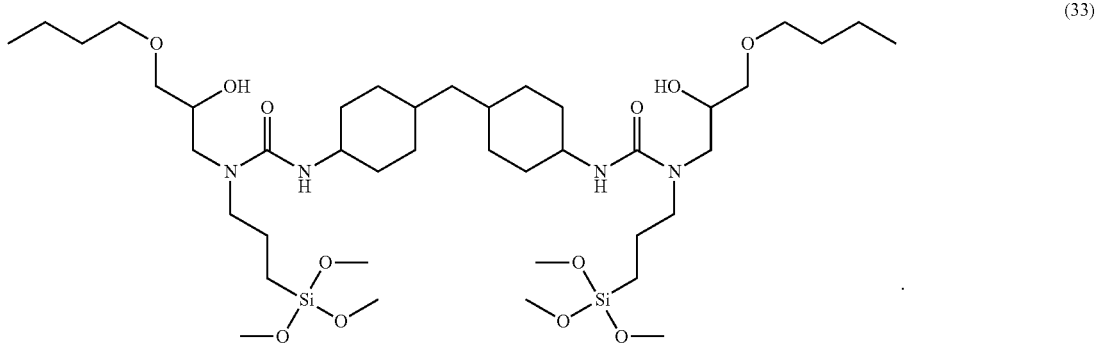

(33)

An embodiment of a coating composition comprises at least one of (31), (32), and (33).

In an aspect, at least a portion of an aminoalkoxysilane is reacted with a compound of formula (2) to yield an alkoxysilylamine, and the alkoxysilylamine is reacted with an isocyanate reagent comprising at least one of (8), (10), and (28) to yield at least one of the following formula (34) and formulas (14) and (15):

formula (7) to yield a mixture alkoxysilylamines; and the mixture alkoxysilylamines is reacted with an isocyanate reagent comprising at least one compound selected from formulas (9), (11), and (29) to yield at least one of (16)-(27) and (31)-(33).

In an aspect, at least a portion of an aminoalkoxysilane is reacted with a compound of formula (5) to yield an alkoxysilylamine, and the alkoxysilylamine is reacted with an isocyanate reagent comprising at least one of (8), (10), and (28) to yield at least one compound of (35), (36), and (37):

(34)

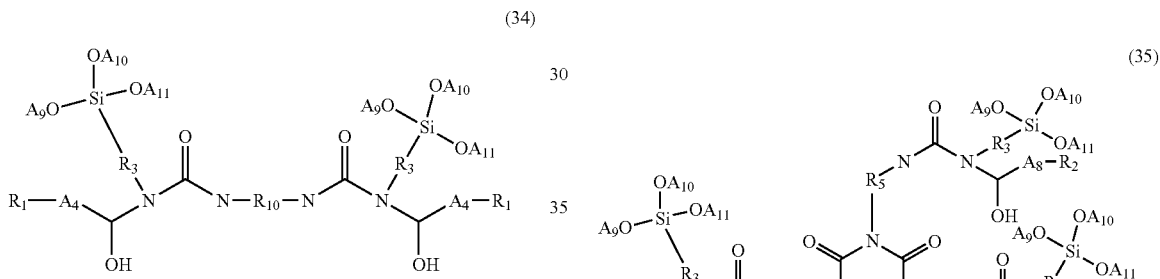

wherein $A_4$ includes a carbonyl-containing linking group, $A_9$, $A_{10}$, and $A_{11}$ are the same or different and comprise hydrogen or $C_1$-$C_4$ alkyl, with the proviso that at least one of $A_9$, $A_{10}$, and $A_{11}$ comprises $C_1$-$C_4$ alkyl, $R_1$ comprises a branched aliphatic group having at least six carbon atoms, $R_3$ is $C_1$-$C_4$ alkyl, and $R_{10}$ comprises a linear, branched, cyclic, or bicyclic aliphatic group having at least seven carbon atoms. An embodiment of a coating composition comprises at least one of (14), (15), and (34).

In an embodiment, at least a portion of an aminoalkoxysilane is reacted with a compound of formula (4) to yield an alkoxysilylamine, and the alkoxysilylamine is reacted with an isocyanate reagent comprising at least one of (9), (11), and (29) to yield at least one of (16), (17), and (31).

An embodiment of a coating composition comprises at least one of (16), (17), and (31).

In an aspect, a portion of an aminoalkoxysilane is reacted with a compound of formula (2) and another portion of the aminoalkoxysilane is reacted with a compound of formula (5) to yield a mixture alkoxysilylamines; and the mixture alkoxysilylamines is reacted with an isocyanate reagent comprising at least one compound selected from formulas (8), (10), and (28) to yield at least one (12), (13), and (30). An embodiment of a coating composition comprises at least one of (12), (13), and (30).

In an embodiment, a portion of an aminoalkoxysilane is reacted with a compound of formula (4) and another portion of the aminoalkoxysilane is reacted with a compound of wherein $A_8$ comprises an ether-containing linking group, $A_9$, $A_{10}$, and $A_{11}$ are the same or different and comprise hydrogen or $C_1$-$C_4$alkyl, with the proviso that at least one of $A_9$, $A_{10}$, and $A_{11}$ comprises $C_1$-$C_4$ alkyl, $R_2$ comprises a linear aliphatic group having at least two carbon atoms, $R_3$ is $C_1$-$C_4$ alkyl, $R_4$-$R_6$ are the same or different and comprise two to eight carbon atoms, $R_7$-$R_9$ are the same or different and comprise two to eight carbon atoms, and $R_{10}$ comprises a linear, branched, cyclic, or bicyclic aliphatic group having at least seven carbon atoms. An embodiment of a coating composition comprises at least one of (35), (36), and (37).

In an embodiment, at least a portion of an aminoalkoxysilane is reacted with a compound of formula (7) to yield an alkoxysilylamine, and the alkoxysilylamine is reacted with an isocyanate reagent comprising at least one compound selected from formulas (9), (11), and (29) to yield at least one compound selected from formulas (20), (24), and (33). An embodiment of a coating composition comprises at least one compound selected from formulas (20), (24), and (33).

Insofar as the present application discloses aspects other than the method for preparing the coating composition, it should be noted that the above reactions are not limiting, however, because there are other ways to create the above-described monomers.

The coating composition has long-term shelf stability and is capable of forming siloxane bonds effectively. It is generally believed that, during a process of curing the coating composition, the alkoxy groups at least partially hydrolyze when exposed to water in air. As these hydrolysis reactions occur, the alkoxy groups convert to silanol groups. It is also believed that at least a portion of the silanol groups crosslink together to form siloxane linkages. The hydrolysis reactions may also produce water and one or more types of alcohol, which may evaporate from the coating composition. While alcohol may be considered VOC, it is generally believed that the amount of alcohol produced during the curing process is substantially lower than the amounts of VOCs that are produced during curing of an organic solvent-based coating composition.

It is generally believed that the monomers may, in some instances, include hydrophobic structures that slow the progress of a hydrolysis reaction between water and the alkoxy groups. To speed curing of the composition, a catalytic deprotectant may be provided in a coating composition in an amount that is catalytically effective to deprotect alkoxy groups of the heretofore described when the monomer is exposed to ambient water. Exemplary catalytic deprotectants include at least one of alkylamines or organotins. In some embodiments, catalytic deprotectants can accelerate the production of the silanol groups during curing of the coating composition.

For example, without intending to be bound by any particular theory, it is believed that an alkylamine, such as dibutylamine, may catalytically deprotect the alkoxy groups according to the following reaction:

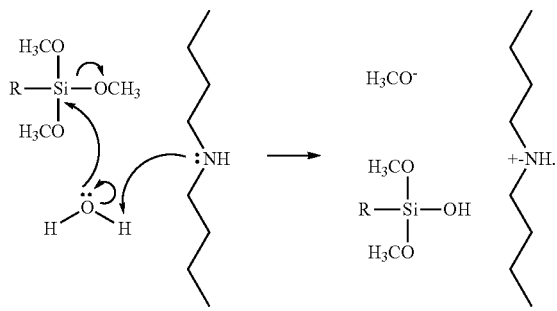

Any suitable alkylamine may be provided in the coating composition. Exemplary secondary and tertiary amines include di- and trimethyl amine, di and triethyl amine, di- and tripropyl amine, di- and tributyl amine, di- and tripentyl amine, di- and trihexyl amine, n-ethylmethylamine, n-ethylpropylamine, n-ethylbutylamine, n-ethylpentylamine, n-methylpropylamine, n-propylbutylamine, n-pentylpropylamine, n-butylmethylamine, n-butylpentylamine, n-butylhexylamine, n-pentylhexylamine, n-isopropylmethylamine, n-methylisobutylamine, ethylisobutylamine, diisobutyl amine, and diisopropyl amine. In exemplary coating compositions, the alkylamine can be included in an amount of 0.15 wt % based on the total amount of the coating composition.

Any suitable organotin may be provided in the coating composition. Exemplary organotins include tributyltin compounds such as tributyltin hydride, trimethyltin compounds such as trimethyltin hydride, tricyclohexyltin compounds such as tricyclohexyltin hydride, tripropyltin compounds such as tripropyltin hydride, dibutyltin compounds such as dibutyltin laurate and dibutyltin bis(2-ethylhexanoate), and dimethyltin compounds such as dimethyltin dineodecanoate.

A deprotecting catalyst may be included in a coating composition in any amount that is catalytically effective to deprotect alkoxy groups of the monomer when the monomer is exposed to ambient water. In exemplary coating compositions, a deprotecting catalyst can be included in an amount of 0.1 to 1.7 wt %, 0.3 to 1.5 wt %, 0.5 to 1.3 wt %, or 0.7 to 1.1 wt %, based on the total amount of the coating composition.

The coating composition may include other functional ingredients in amounts intended for their effective purposes. For example, the coating composition may contain a colorant, such as a pigment such as titanium dioxide. The colorant may be present in any amount suitable to impart color and covering effect to the finished coating; for example, when the pigment is titanium dioxide, it may be present in an amount ranging from 5 to 30% by weight of the composition. Other suitable pigments include any suitable pigment particles, such as azo pigments, anazurite, aluminum silicate, aluminum potassium silicate, aluminum paste, anthraquinone pigments, antimony oxide, barium metaborate, barium sulfate, calcium carbonate, calcium metaborate, calcium metasilicate, carbon black, chromium oxides, clay, copper oxides, copper oxychloride, dioxazine pigments, feldspar, hansa yellows, iron oxides such as yellow and red iron oxides, isoindoline pigments, kaolinite, lithopone, magnesium silicates, metallic flakes, mica, napthol pigments such as napthol reds, nitroso pigments, nepheline syenite, perinone pigments, perylene pigments, polycyclic pigments, pyrropyrrol pigments, pthalocyanines such as copper pthalocyanine blue and copper pthalocyanine green, quinacridones such as quinacridone violets, quinophthalone pigments, silicates, sulfides, talc, titanium dioxide, ultramarine, zinc chromate, zinc oxide, and zinc phosphate. In addition, pearlescents, optical brighteners, ultraviolet stabilizers, and the like may be employed.

The coating composition also may include any one or more of dispersants, surfactants, wetting agents, synergists, and rheology modifiers. Any suitable dispersant, such as any one or more of anionic dispersants, cationic dispersants, amphoteric dispersants, or nonionic dispersants may be used in conjunction with a pigment vehicle. Other known dispersants believed to be suitable include NUOSPERSE® 657 and NUOSPERSE® FA 196 available from Elementis Specialties, DISPERBYK 108 available from Altana AG, and SOLSPERSE™ M387 available from Lubrizol Corporation.

Similarly, any suitable wetting agents such as any one or more of anionic wetting agents, cationic wetting agents, amphoteric wetting agents, or nonionic wetting agents may be used. An exemplary synergist is SOLSPERSE™ 5000 available from Lubrizol Corporation. Exemplary rheology modifiers include SUSPENO 201-MS available from Poly-Resyn, Inc. and AEROSIL® available from Evonik Industries.

Once formed, the coating composition may be applied immediately to a substrate, but the coating composition also may be dispensed into a suitable container, such as a paint can, and sealed. It is believed that the coating composition will have a shelf life of at least several months.

A method of applying a coating composition can comprise applying the coating composition to a substrate, and allowing the coating composition to cure. Once applied to the substrate, the coating composition will cure as the composition crosslinks. The curing process does not require additional equipment (e.g., a UV source), but rather, it is believed that the curing occurs when the coating composition is exposed to air containing water.

The coating composition may be employed for any suitable purpose. In some embodiments, the coating composition may be applied to interior or exterior surfaces such as wood, drywall, cement, metal, and plaster, or over a primer coating. In certain embodiments, the coating composition may be applied to metals, composites, and other materials as a protective coating. In other embodiments, the coating composition may be applied to a surface in order to impart dry-erase characteristics. For example, the surface may be a wall, which may have paint or a primer already applied to the surface of the wall, over which the coating can be applied to form a dry-erase surface. The coating composition may be applied with brush, roller, sponge, or spray gun, or other conventional painting tool. The cured coating may have any suitable thickness, such as a thickness ranging from 0.05-2 mm with preferred thickness around 0.1 mm.

EXAMPLES

Example 1

An alkoxysilylamine was produced by reacting 36.1 g of DYNASYLAN® AMMO and 50.6 g of CARDURA™ E10-P in a flask, and mixing and reacting the contents of the flask for 3 hr at 65° C. to form Compound 1.

Example 1 was prepared by adding 6.8 g of DESMODUR® 3300 to 30 g of Compound 1. The molar ratio of these components was 1:1:0.5 (AMMO:CARDURA:DESMODUR).

Example 2

Example 1 was repeated, except that DESMODUR® 3900 was used in place of DESMODUR, 3300. A small quantity comprising of 0.02 g of dibutyltin dilaurate was added as a deprotectant catalyst.

Example 3

Example 2 was repeated, except that 7.4 g of DESMODUR® 3900 was added to 50.5 g of Compound 1 for a molar ratio of 1:1:0.33.

Example 4

An alkoxysilylamine was produced by reacting 50.0 g of DYNASYLAN® AMMO and 42.9 g of ERISYS® GE-5 in a flask, and mixing and reacting the contents of the flask for 2 hr at 65° C. to form Compound 2.

Example 4 was prepared by adding 18.5 g of DESMODUR® 3900 to 69.0 g of Compound 2. The molar ratio was 1:1:0.5 (AMMO:ERISYS:DESMODUR). A quantity of 0.1 g of dibutyl amine was added as a deprotectant catalyst.

Example 5

Example 4 was repeated, except that 6.8 g of DESMODUR® 3900 was added to 63.4 g of Compound 2 for a molar ratio of 1:1:0.2, A quantity of 0.1 g of dibutyl amine was added as a deprotectant catalyst.

Example 6 [MXR-306-19]

An alkoxysilylamine was produced by reacting 736.0 g of DYNASYLAN® AMMO, 509.6 g of CARDURA™ E10-P, and 318.4 g of ERISYS® GE-5 in a flask, and mixing and reacting the contents of the flask for 3 hr at 65° C. The mixture was cooled to room temperature and 107.4 g of DESMODUR® W was added to yield a monomer having plural alkoxysilane groups. The molar ratio was 1:0.5:0.5:0.2 (AMMO:CARDURA:ERISYS:DESMODUR). A quantity of 16.7 g of dibutyl amine was added as a deprotectant catalyst.

These formulations were evaluated for viscosity (rating from A=thin to Z-thick). Subsequently, these formulations were coated onto 2 mil Bond-Rite panels and tested for pencil hardness (ASTM D5363 (2016)) and impact hardness (ASTM D2794 (2016)). The following results were obtained.

| Example | AMMO | Cardura E-10 | Erisys GE-5 | Desmodur 3300 | Desmodur 3900 | Desmodur W | Dibutyltin Dilaurate | Dibutyl amine | Viscosity | Pencil Hardness | Impact Hardness |
|---|---|---|---|---|---|---|---|---|---|---|---|
| 1 | 1 | 1 | | 0.5 | | | | | >Z9 | | |
| 2 | 1 | 1 | | | 0.5 | | <1% | | >Z9 | 4H | |
| 3 | 1 | 1 | | | 0.333 | | <1% | | Z7-Z8 | 4H | |
| 4 | 1 | | 1 | | 0.5 | | | <1% | Z3-Z4 | 4H | |
| 5 | 1 | | 1 | | 0.2 | | | 1% | I-J | H | 160 |
| 6 | 1 | 0.5 | 0.5 | | | 0.2 | | 1% | O | 4H | 172 |

Without intending to be bound by any particular theory, it is generally believed that the coating composition of Example 6 had acceptable viscosity and provided a cured coating having a balance of hardness and flexibility to due to the relative amounts of DYNASYLAN® AMMO, CARDURA™ E10-P, and ERISYS® GE-5, and DESMODUR® W used to make the coating composition.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A method of making a coating composition, the method comprising:
   providing an aminoalkoxysilane;
   in the substantial absence of water, reacting at least a portion of said aminoalkoxysilane with a compound of the following formula (2):

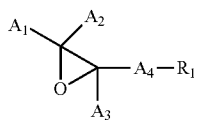
(2)

wherein $A_1$-$A_3$ are the same or different and comprise hydrogen or a carbon-containing group with one to three carbon atoms, $A_4$ comprises a carbonyl-containing linking group, and $R_1$ comprises a branched aliphatic group having at least six carbon atoms, the reaction yielding an alkoxysilylamine; and
   reacting said alkoxysilylamine with an isocyanate reagent containing at least two isocyanate groups to yield a monomer having plural alkoxysilane groups and at least two branched aliphatic groups having at least six carbon atoms.

2. The method according to claim 1, 0.5 to 1.5 parts of said aminoalkoxysilane being blended with 0.25 to 1.5 parts of said compound of formula (2).

3. The method of claim 2, said alkoxysilylamine being reacted with 0.05 to 0.75 parts of said isocyanate reagent.

4. The method according to claim 1, further comprising providing a catalytic deprotectant in an amount catalytically effective to deprotect alkoxy groups when said monomer is exposed to ambient water, said catalytic deprotectant comprising at least one of an alkylamine and an organotin compound.

5. The method according to claim 4, said catalytic deprotectant comprising at least one of dibutylamine and dibutyltin dilaurate.

6. The method according to claim 1, said aminoalkoxysilane having a structure represented by the following formula (1):

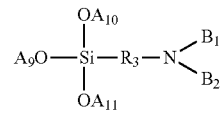
(1)

where $A_9$, $A_{10}$, and $A_{11}$ are the same or different and comprise hydrogen or $C_1$-$C_4$ alkyl, with the proviso that at least one of $A_9$, $A_{10}$, and $A_{11}$ comprises $C_1$-$C_4$ alkyl, where $B_1$ and $B_2$ are the same or different and comprise hydrogen or $C_1$-$C_4$ alkyl, with the proviso that at least one of $B_1$ and $B_2$ is hydrogen, and where $R_3$ is $C_1$-$C_4$ alkyl.

7. The method according to claim 1, said compound of formula (2) being a glycidyl aliphatic ester.

8. The method according to claim 7, said glycidyl aliphatic ester having the following formula (3):

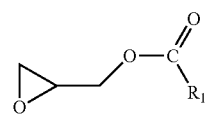
(3)

wherein $R_1$ comprises a branched aliphatic group having at least six carbon atoms.

9. The method according to claim 8, said glycidyl aliphatic ester having the following formula (4):

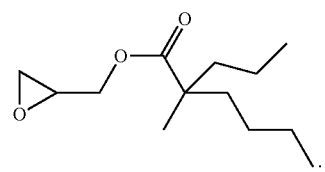
(4)

10. The method according to claim 1, said isocyanate reagent comprising at least one of (8) and (10):

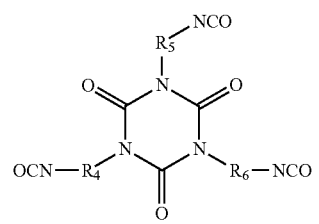
(8)

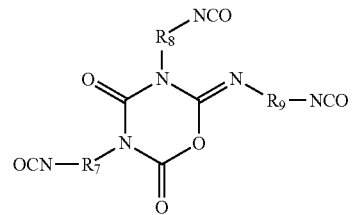
(10)

wherein $R_4$-$R_6$ are the same or different and comprise two to eight carbon atoms, and $R_7$-$R_9$ are the same or different and comprise two to eight carbon atoms.

11. The method according to claim 10, said isocyanate reagent comprising at least one of (9) and (11):

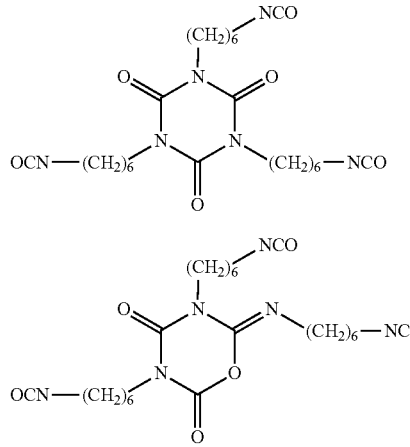

12. The method according to claim 1, said monomer comprising at least one of (14) and (15):

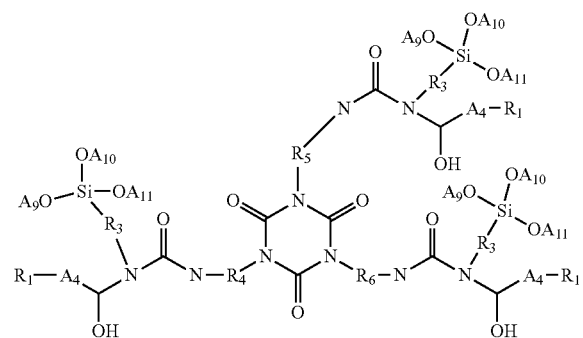

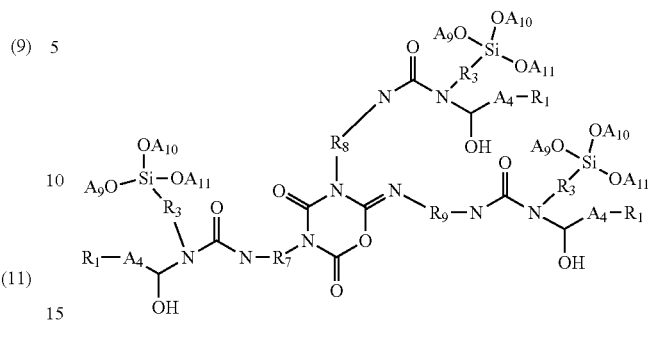

wherein $A_4$ includes a carbonyl-containing linking group, $A_9$, $A_{10}$, and $A_{11}$ are the same or different and comprise hydrogen or $C_1$-$C_4$ alkyl, with the proviso that at least one of $A_9$, $A_{10}$, and $A_{11}$ comprises $C_1$-$C_4$ alkyl, $R_1$ comprises a branched aliphatic group having at least six carbon atoms, $R_3$ is $C_1$-$C_4$ alkyl, $R_4$-$R_6$ are the same or different and comprise two to eight carbon atoms, and $R_7$-$R_9$ are the same or different and comprise two to eight carbon atoms.

13. The method according to claim 12, said monomer comprising at least one of (16) and (17):

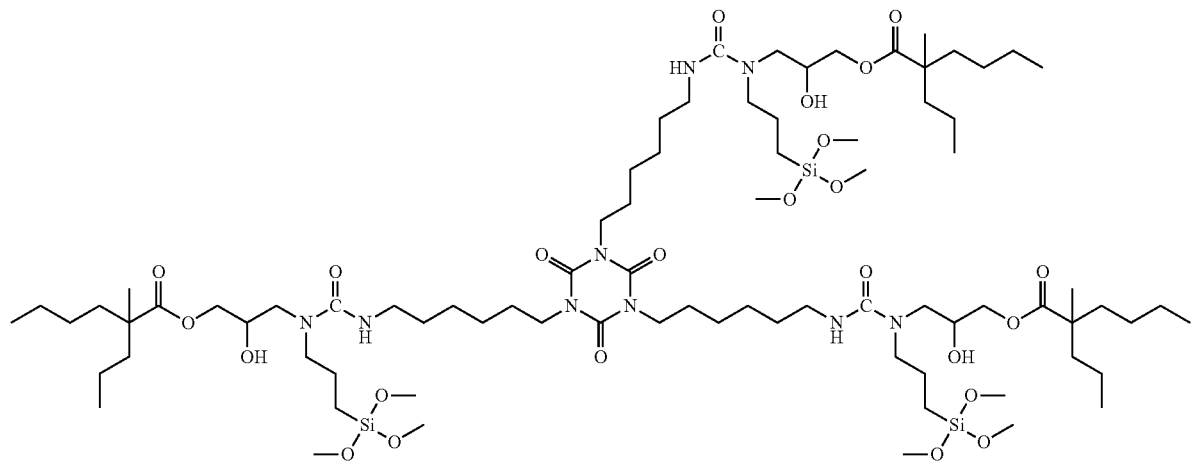

-continued (17)

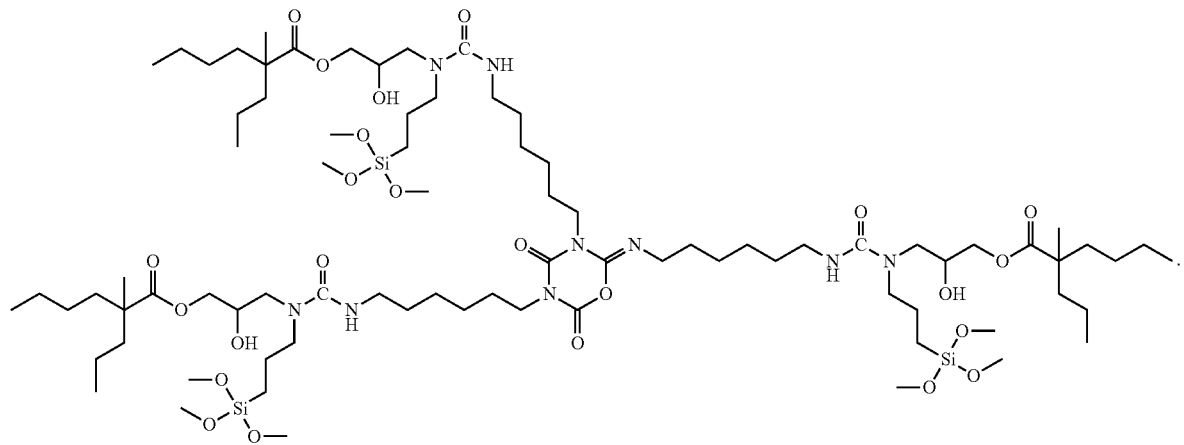

14. The method according to claim 1, further including adding a pigment.

15. The method according to claim 14, the pigment including titanium dioxide.

16. A coating composition prepared by the method according to claim 1.

17. A coating composition comprising at least one of (14) and (15):

(14)

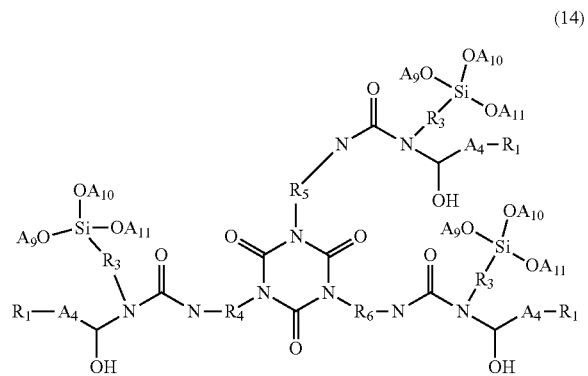

-continued (15)

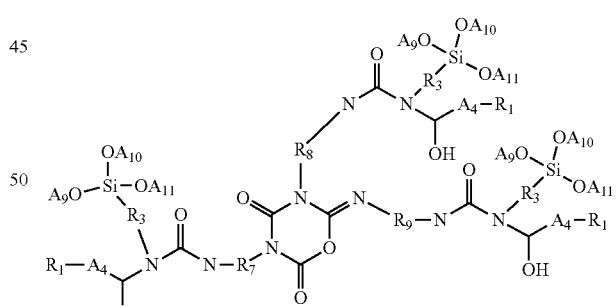

wherein $A_4$ includes a carbonyl-containing linking group, $A_9$, $A_{10}$, and $A_{11}$ are the same or different and comprise hydrogen or $C_1$-$C_4$ alkyl, with the proviso that at least one of $A_9$, $A_{10}$, and $A_{11}$ comprises $C_1$-$C_4$ alkyl, $R_1$ comprises a branched aliphatic group having at least six carbon atoms, $R_3$ is $C_1$-$C_4$ alkyl, $R_4$-$R_6$ are the same or different and comprise two to eight carbon atoms, and $R_7$-$R_9$ are the same or different and comprise two to eight carbon atoms.

18. The coating composition according to claim 17, comprising at least one of (16) and (17):

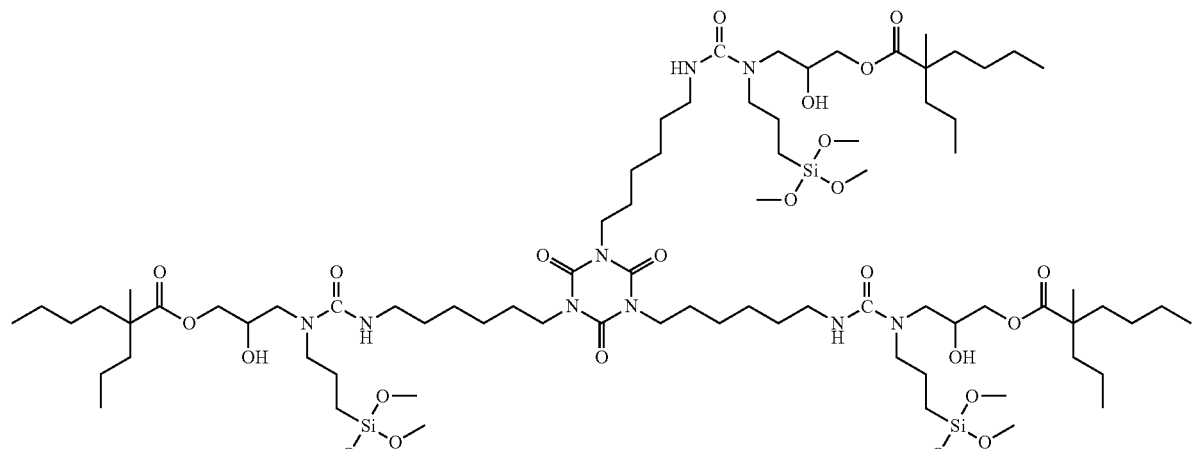

(16)

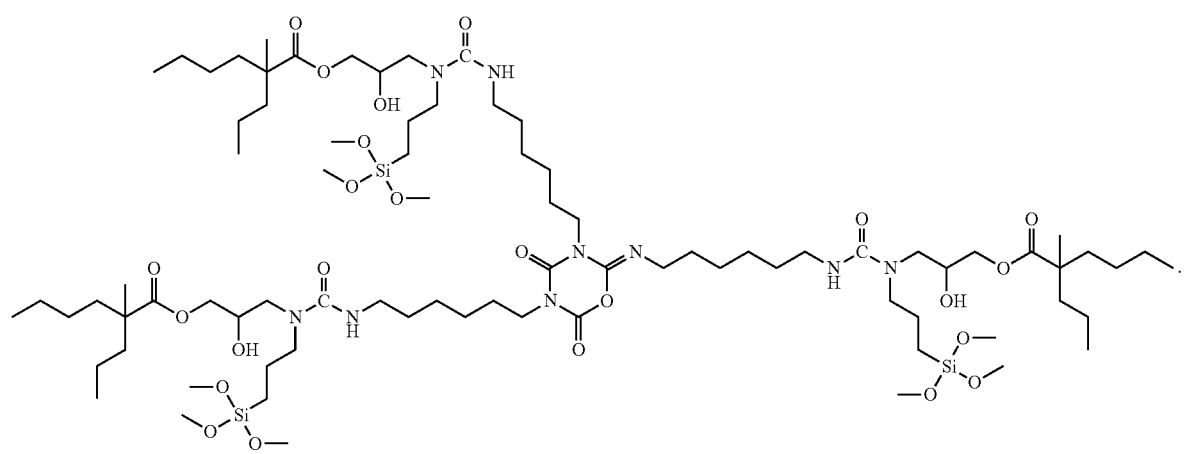

(17)

19. The coating composition according to claim 17, further comprising a pigment.

20. The coating composition according to claim 19, the pigment including titanium dioxide.

21. A method of applying a coating composition, the method comprising applying the coating composition according to claim 17 to a substrate, and allowing the coating composition to cure.

22. A cured coating comprising a cross-linked product of the coating composition according to claim 17.

23. A method of making a coating composition, the method comprising:
providing an aminoalkoxysilane;
in the substantial absence of water, reacting a portion of said aminoalkoxysilane with a compound of the following formula (2) and reacting another portion of said aminoalkoxysilane with a compound of the following formula (5):

(2)

$$\begin{array}{c} A_1 \quad A_2 \\ \diagdown \diagup \\ O \\ \diagup \diagdown \\ A_3 \end{array} A_4 - R_1$$

wherein $A_1$-$A_3$ are the same or different and comprise hydrogen or a carbon-containing group with one to three carbon atoms, $A_4$ comprises a carbonyl-containing linking group, and $R_1$ comprises a branched aliphatic group having at least six carbon atoms, (5)

$$\begin{array}{c} A_5 \quad A_6 \\ \diagdown \diagup \\ O \\ \diagup \diagdown \\ A_7 \end{array} A_8 - R_2$$

wherein $A_5$-$A_7$ are the same or different and comprise hydrogen or a carbon-containing group with one to three carbon atoms, $A_8$ comprises an ether-containing linking group, and $R_2$ comprises a linear aliphatic group having at least two carbon atoms, the reactions between said aminoalkoxysilane and said compounds of formulas (2) and (5) yielding a mixture of alkoxysilylamines; and reacting said mixture of alkoxysilylamines with an isocyanate reagent containing at least two isocyanate groups to yield a monomer having plural alkoxysilane groups.

24. The method according to claim 23, 0.5 to 1.5 parts of said aminoalkoxysilane being blended with 0.25 to 1.5 parts of said compound of formula (2) and 0.25 to 1.5 parts of said compound of formula (5).

25. The method of claim 24, said mixture of alkoxysilylamines being reacted with 0.05 to 0.75 parts of said isocyanate reagent.

26. The method according to claim 23, further comprising providing a catalytic deprotectant in an amount catalytically effective to deprotect alkoxy groups when said monomer is exposed to ambient water, said catalytic deprotectant comprising at least one of an alkylamine and an organotin.

27. The method according to claim 26, said catalytic deprotectant comprising at least one of dibutylamine and dibutyltin dilaurate.

28. The method according to claim 23, said aminoalkoxysilane having a structure represented by the following formula (1):

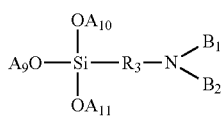
(1)

where $A_9$, $A_{10}$, and $A_{11}$ are the same or different and comprise hydrogen or $C_1$-$C_4$ alkyl, with the proviso that at least one of $A_9$, $A_{10}$, and $A_{11}$ comprises $C_1$-$C_4$ alkyl, where $B_1$ and $B_2$ are the same or different and comprise hydrogen or $C_1$-$C_4$ alkyl, with the proviso that at least one of $B_1$ and $B_2$ is hydrogen, and where $R_3$ is $C_1$-$C_4$ alkyl.

29. The method according to claim 23, said compound of formula (2) being a glycidyl aliphatic ester.

30. The method according to claim 29, said glycidyl aliphatic ester having the following formula (3):

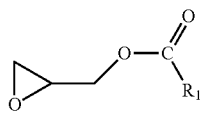
(3)

wherein $R_1$ comprises a branched aliphatic group having at least six carbon atoms.

31. The method according to claim 30, said glycidyl aliphatic ester having the following formula (4):

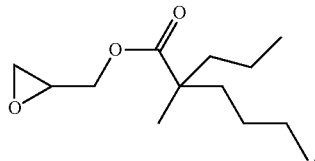
(4)

32. The method according to claim 23, said compound of formula (5) being a glycidyl aliphatic ether.

33. The method according to claim 32, said glycidyl aliphatic ether having the following formula (6):

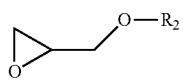
(6)

wherein $R_2$ comprises a linear aliphatic group having at least two carbon atoms.

34. The method according to claim 33, said glycidyl aliphatic ether having the following formula (7):

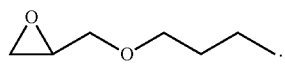
(7)

35. The method according to claim 23, said isocyanate reagent comprising a compound according to formula (28):

$$OCN—R_{10}—NCO \quad (28)$$

wherein $R_{10}$ comprises a linear, branched, cyclic, or bicyclic aliphatic group having at least seven carbon atoms.

36. The method according to claim 35, said isocyanate reagent comprising a compound of formula (29):

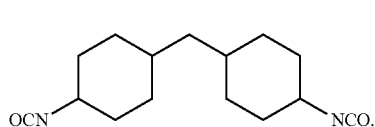
(29)

37. The method according to claim 23, said monomer comprising at least one compound according to formula (30):

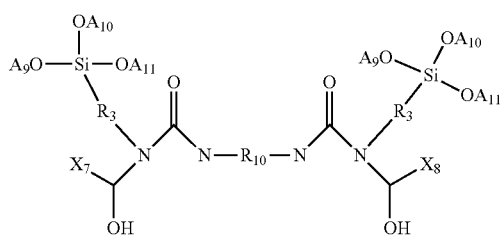
(30)

wherein $A_9$, $A_{10}$, and $A_{11}$ are the same or different and comprise hydrogen or $C_1$-$C_4$ alkyl, with the proviso that at least one of $A_9$, $A_{10}$, and $A_{11}$ comprises $C_1$-$C_4$ alkyl, $R_3$ is $C_1$-$C_4$ alkyl, $R_{10}$ comprises a linear, branched, cyclic, or bicyclic aliphatic group having at least seven carbon atoms, and $X_7$ and $X_8$ are the same or different and comprise one the following groups (a) and (b):

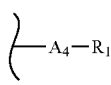
(a)

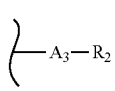
(b)

wherein $A_4$ includes a carbonyl-containing linking group, $R_1$ comprises a branched aliphatic group having at least six carbon atoms, $A_8$ includes an ether-containing linking group, and $R_2$ comprises a linear aliphatic group having at least two carbon atoms.

38. The method according to claim 37, said monomer comprising at least one of (31), (32), and (33):

(31)

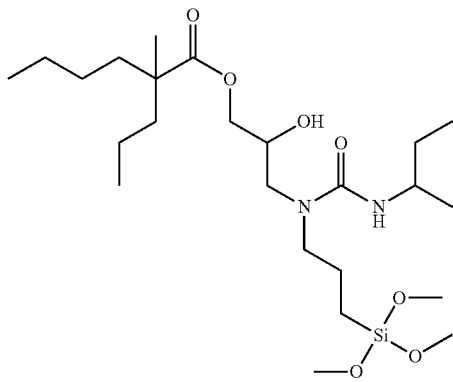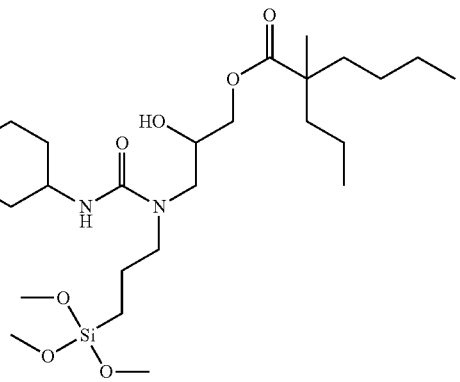

(32)

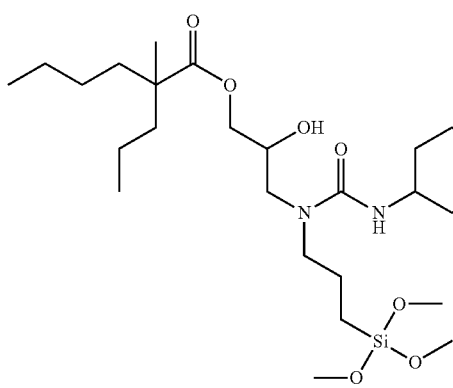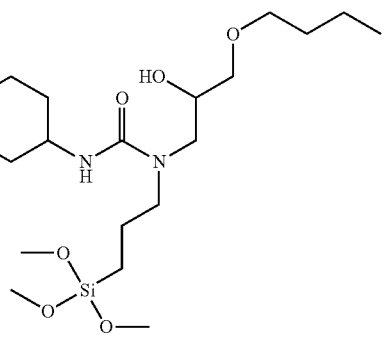

(33)

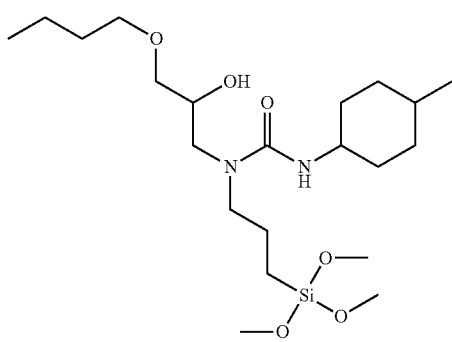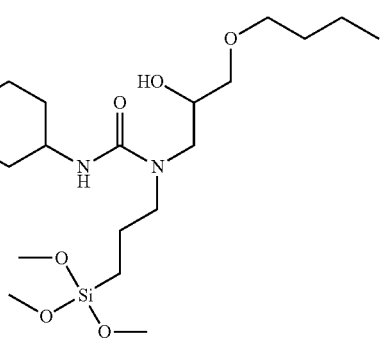

39. The method according to claim 23, further including adding a pigment.

40. The method according to claim 39, the pigment including titanium dioxide.

41. A coating composition prepared by the method according to claim 23.

42. A coating composition comprising at least one compound according to formula (30):

(30)

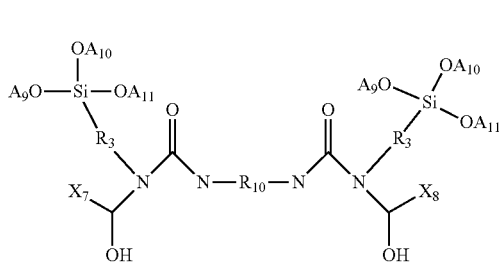

wherein $A_9$, $A_{10}$, and $A_{11}$ are the same or different and comprise hydrogen or $C_1$-$C_4$ alkyl, with the proviso that at least one of $A_9$, $A_{10}$, and $A_{11}$ comprises $C_1$-$C_4$ alkyl, $R_3$ is $C_1$-$C_4$ alkyl, $R_{10}$ comprises a linear, branched, cyclic, or bicyclic aliphatic group having at least seven carbon atoms, and $X_7$ and $X_8$ are the same or different and comprise one the following groups (a) and (b):

(a)

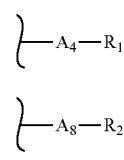

(b)

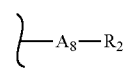

wherein $A_4$ includes a carbonyl-containing linking group, $R_1$ comprises a branched aliphatic group having at least six carbon atoms, $A_8$ includes an ether-containing linking group, and R$_2$ comprises a linear aliphatic group having at least two carbon atoms.

43. The coating composition according to claim 42, comprising at least one of (31), (32), and (33):

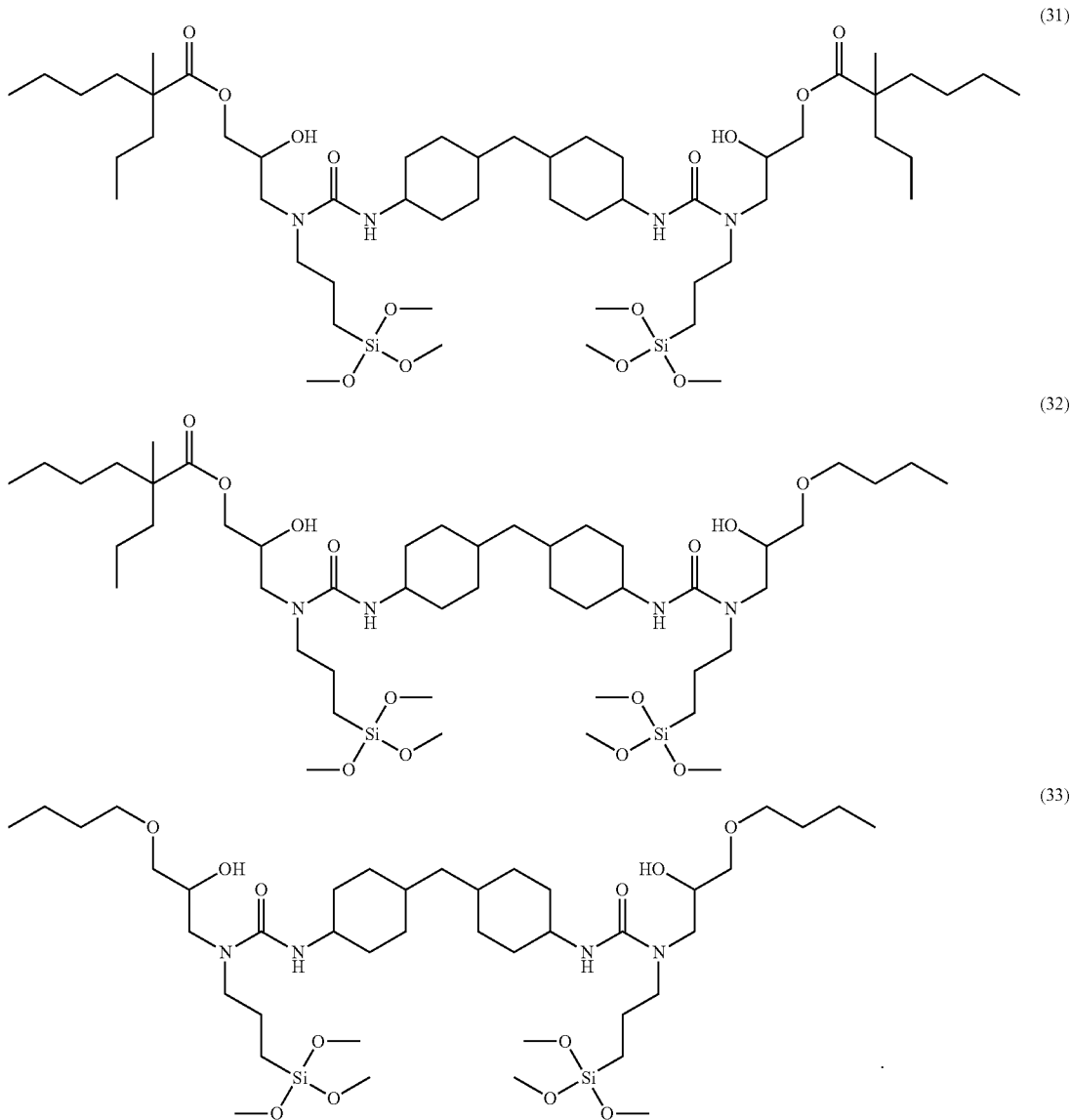

44. The coating composition according to claim 42, further comprising a pigment.

45. The coating composition according to claim 44, the pigment including titanium dioxide.

46. A method of applying a coating composition, the method comprising applying the coating composition according to claim 42 to a substrate, and allowing the coating composition to cure.

47. A cured coating comprising a cross-linked product of the coating composition according to claim 42.

* * * * *